United States
Dykes

3,998,532
Dec. 21, 1976

[54] WIDE ANGLE SINGLE CHANNEL PROJECTION APPARATUS

[75] Inventor: Wiley V. Dykes, Winter Park, Fla.

[73] Assignee: The United States of America as represented by the Secretary of the Navy, Washington, D.C.

[22] Filed: Apr. 8, 1974

[21] Appl. No.: 459,143

[52] U.S. Cl. .................................. 352/69; 352/132; 35/12 N; 352/198

[51] Int. Cl.² ........................................ G03B 37/00

[58] Field of Search .................. 352/69, 132, 198; 35/12 N, 12 W; 353/122; 350/21

[56] References Cited

UNITED STATES PATENTS

| | | | |
|---|---|---|---|
| 3,101,645 | 8/1963 | Hemstreet | 352/85 |
| 3,281,519 | 10/1966 | Giordano | 35/12 N |
| 3,296,923 | 1/1967 | Miles | 352/198 |
| 3,367,046 | 2/1968 | Neuberger | 352/130 |
| 3,539,249 | 11/1970 | Jaulmes | 352/69 |
| 3,758,714 | 9/1973 | Herndon | 35/12 N |

FOREIGN PATENTS OR APPLICATIONS

| | | | |
|---|---|---|---|
| 728,429 | 2/1966 | Canada | 352/69 |
| 1,026,870 | 4/1966 | United Kingdom | 352/69 |

*Primary Examiner*—Monroe H. Hayes
*Attorney, Agent, or Firm*—Richard S. Sciascia; John W. Pease; Don D. Doty

[57] ABSTRACT

The invention utilizes a vertically positioned arc lamp and associated lamp collector-reflector in conjunction with depending associated secondary and projection mirrors, the projection mirror being convex and centrally apertured to form an exit pupil closely adjacent and above the head of an observer and in the center of a curved projection screen to minimize perspective distortion of image as seen by the viewer. The invention further provides an elimination of shadow effect by the depending relationship of the apparatus and by the recessing of arc lamp electrode through an aperture in the lamp reflector. An adaption of image spacing by recessed fitting of image on film to adapt the film to intended projector image width is also an aspect of the invention.

3 Claims, 6 Drawing Figures

WIDE ANGLE SINGLE CHANNEL PROJECTION APPARATUS

CROSS REFERENCE TO RELATED APPLICATIONS

This application covers the overall system of apparatus and relates to pending application identified as U.S. application Ser. No. 458,610 filed Apr. 8, 1974, covering a specific lens system useable in the overall system.

BACKGROUND OF THE INVENTION

The invention relates to the field of optics and more particularly to wide angle display apparatus and systems for visual projected displays up to and including 360° displays.

In many training situations the presentation of an external environment is a necessity in order for the trainee to perceive visual cues and thereby learn to take actions or manipulate equipment to maximum advantage for a given situation. A particularly useful approach to reality in display is to produce an extremely wide-angle presentation to produce the effect of the observer being in the center of the scene activity. Such systems may approach and may also include 360° panoramic projection. One prior attempt at 360° image transfer in the taking or projection of an image has been to use a convex mirror to gather or project the 360° scene in association with a viewing piece or film. In one example, a 360° horizontal field is reflected from the surface of a strongly convex mirror, through a camera lens and onto a plane. The resulting picture has the camera lens at the center of the photograph and a distorted horizon in a circle around it. The distortions are unavoidable with this type of imagery because of simple laws of geometry. A hyperhemispherical space of the kind considered cannot be imaged on a plane without distortions.

If this distorted picture is projected back through the same optical system and onto a spherical screen, no distortions will be perceived by an observer provided (1) both the camera and the projection optics have the same distortion features and (2) the observer's eyes coincide with the exit pupil of the projection lens. However, it is normally not possible for the observer's eyes to coincide exactly with the exit pupil, but a reasonable tolerance (about one-fifth of the radius of the spherical screen) is acceptable. A further disadvantage of prior efforts at annular projection has been shadow interference caused by the light source means or by the observer, or both.

SUMMARY OF THE INVENTION

The disadvantages mentioned above are eliminated in accordance with the subject invention by utilizing an arc lamp light source with an upper electrode recessed through an aperture in the apex of the lamp reflector, which reflector is contoured to pass converging light rays through a condensing lens means to a point on the vertical concentric axis of the projector system, which point is also the exit pupil of a centrally apertured convex projector mirror held in depending position below said lamp and lamp reflector. Also provided in accordance with the invention is a secondary concave mirror held below said projector mirror and contoured to receive said lamp rays through said projector mirror exit pupil and to reflect said rays back to said projection mirror for redirection to said viewing screen. Support means is provided for suspending said equipment above the head of an observer to place the eyes of the observer within the required acceptable distance from said exit pupil to avoid perspective distortion in the picture as viewed by the viewer. The suspended arrangement described eliminates the viewer's interference with the projected image.

DESCRIPTION OF THE PREFERRED EMBODIMENT

Figure 1:
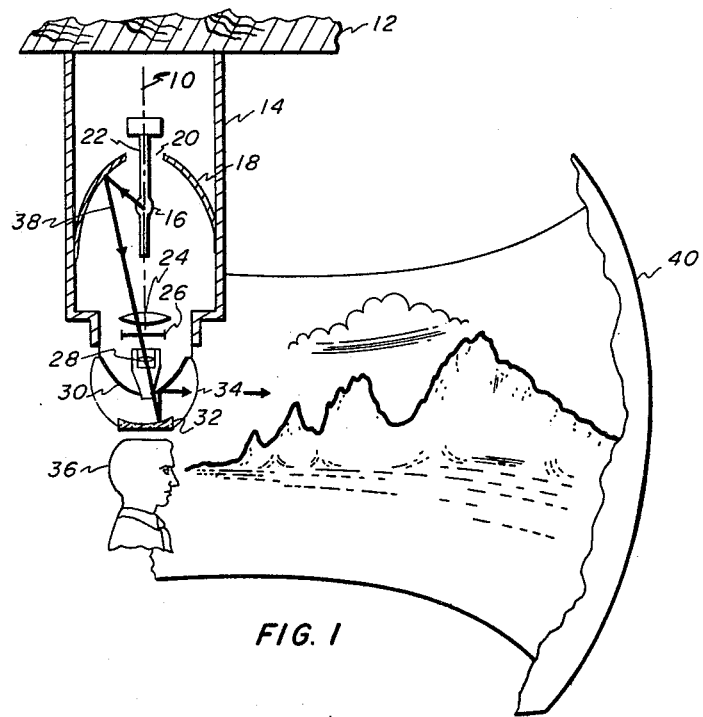
FIG. 1 is a simple diagrammatic view of an overall general arrangement of elements in accordance with one embodiment of the invention.

Referring initially to FIG. 1 there is shown therein the schematic of an annular projector incorporating the invention. In FIG. 1 it will be noted that all elements of the system are on a common vertical axis 10 and are arranged in a depending manner from a fixed support 12 via intermediate support means indicated generally at 14. Thus, in uppermost position is provided an arc lamp 16 and collector-reflector 18, the latter being centrally apertured as at 20 to pass an upper terminal 22 of lamp 16. Depending from the lamp and its reflector in succession are a condenser lens means 24, film or transparency 26, projector lens means 28, primary or projector mirror 30, secondary mirror 32, and a transparent envelope 34 supporting the mirrors 30 and 32 and protecting the mirror surfaces thereof from dust and abrasion.

The provision of the secondary mirror, in accordance with one aspect of the invention, allows the overall projector to be suspended above the head of a viewer 36. This arrangement provides a viewing position wherein the eyes of the viewer are in close approximation with the exit pupil of the lens system to thereby eliminate perspective distortions as will be explained in further detail hereinafter. As indicated by the arrow head directed ray lines 38, the beam from the lamp 16 is reflected from collector-reflector 18, downward through condenser lens means 24, through film transparency 26, through projector lens means 28 and onto secondary mirror 32. The light ray is then reflected upward onto the primary projection mirror 30 and onto the spherical screen 40.

Figure 3:
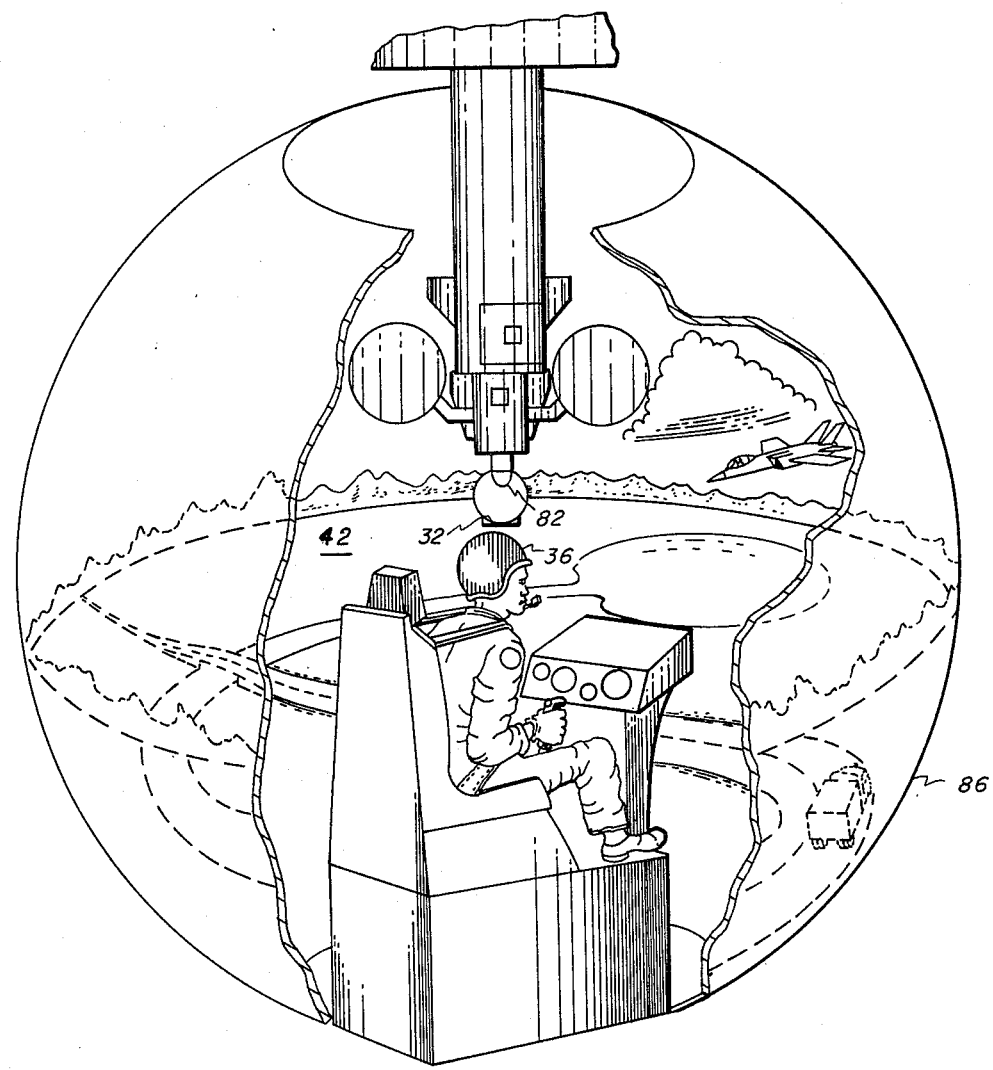
FIG. 3 is an artist's conceptual view of the overall system in a spherical screen.

As shown pictorially in FIG. 3, a scene 42 may be projected on the inside portion of a sphere 40, indicated in FIG. 1. The head of the viewer 36 is adjacent the underside of mirror 32 of the projector to place the eyes of the viewer as close as possible to the exit pupil of the mirror 32. In the arrangement shown in FIG. 3 an unobstructed picture of up to 360° can be projected. The human eye sees about 90° vertically and the head, in a normal position, tilts downward approximately 15°.

Using this information as a design goal, the projected picture should cover an area from 30° above the horizon to 60° below it as indicated in FIG. 3. The subject projection system is capable of filling this area.

Figure 2:
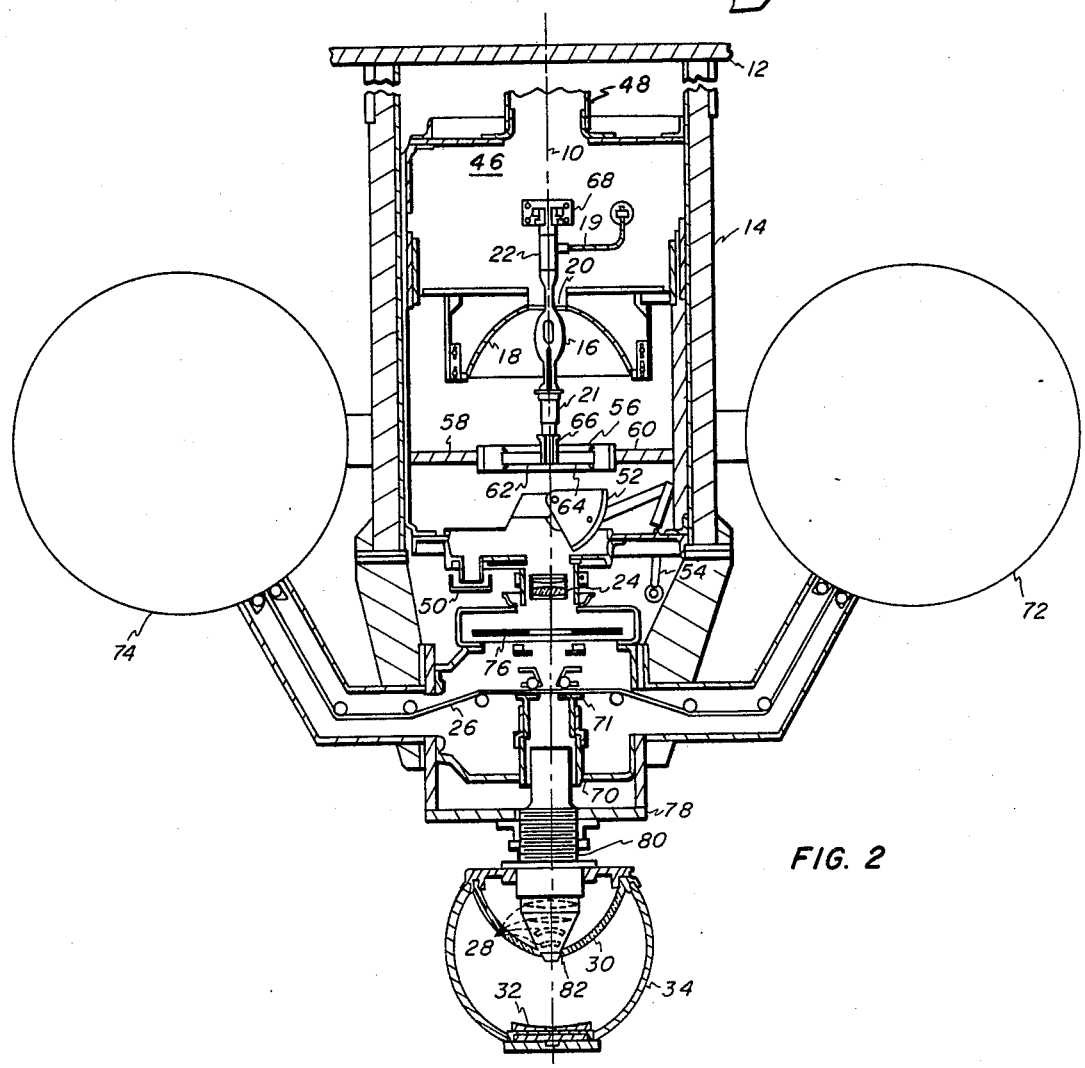
FIG. 2 is a more detailed cross sectional view of the arrangement of FIG. 1 adding additional details of elements for a more thorough understanding of an application of the invention.

A sectional view of the system showing greater detail is shown in FIG. 2. In FIG. 2, the elements of FIG. 1 are given the same number; thus, the main support 12, additional support means 14, xenon arc lamp 16, elipsoidal mirror light collector-reflector 18, condensing lens means 24, film 26 (or transparency slide if used), projection lens system 28, hyperbolic secondary mirror 32 and transparent spherical mirror support 34 are indicated in FIG. 2.

Additionally, in FIG. 2 is shown a lamp housing 46 welded or otherwise fitted to support means 14 and formed with an exhaust stack portion 48 for removing the air heated by lamp 16. Air intake to pass air over the lamp 16 is provided by air intake 50. Also, to prevent the maintenance of heat by lamp rays on the film 26 when the film is stopped, I provide a pivoted light interrupter means 52 manually operable from handle 54 to close off light from application to the film. To support the light 16 I provide a spider type support 56 secured to the support 14 by arms 58, 60 and having at its center four flat, thin metal strips, two of which are seen in FIG. 2 at 62 and 64. Fixed to the four flat strips is a holder 66 for a lower terminal 21 of lamp 16. The flat strips, indicated by 62 and 64, are mounted with the narrow edge portion in the light path and form no objectional interference with light rays. The upper terminal 22 of lamp 16 is passed through the aperture 20 of mirror 18 and hence can have no effect on the light rays. The terminal 22 is supported by a holder 68 secured by screws or other suitable means to the lamp housing 46. Terminal 22 is provided with an electrical line 19 connected to a power source (not shown).

Figure 5:
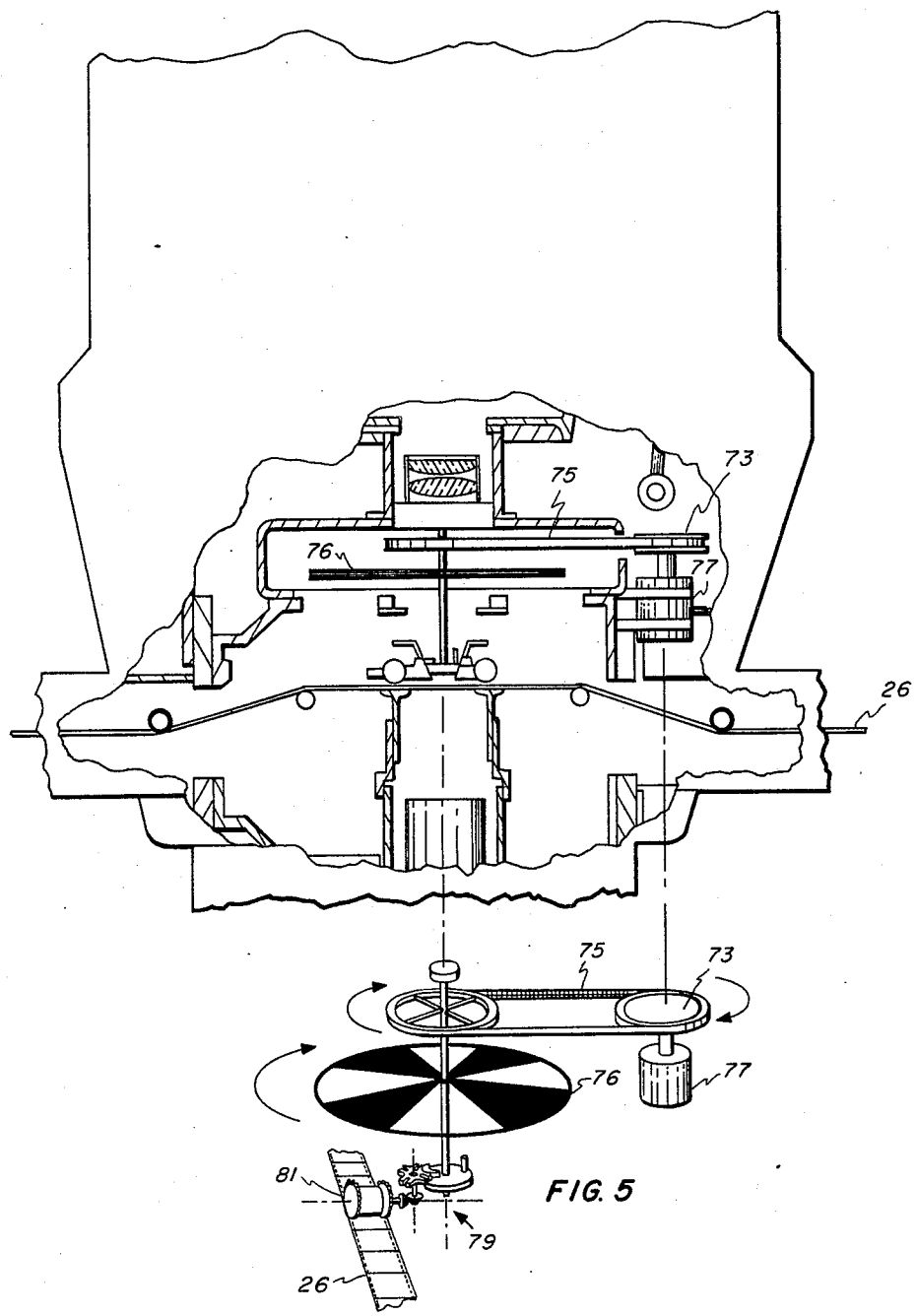
FIG. 5 is a perspective view of motorized drive means for a shutter arrangement and film race employed in the embodiment of FIG. 2.

As indicated in FIG. 2, a film transport 70 is provided to transport the film across the light ray path centered with condensing lens means 24, the film passing between the film reel and enclosures 72, 74. A conventional rotatable shutter 76 of four spaced blades is synchronized in conventional manner with film speed imposed by transport means 70 and gate means 71, the shutter being arranged for pulley-belt 75, 73 drive from a motor 77 as shown in FIG. 5. The motor 77 also drives the film 26 via a geneva drive mechanism 79 and a film drive sprocket 81. A projector lens housing 78 includes a threaded portion indicated at 80 for focusing of the lens system.

In the arrangement thus far described it is to be noted that the invention utilizes a vertically positioned arc lamp 16 and associated lamp collector-reflector 18 in conjunction with depending associated secondary 32 and projection 30 mirrors, the projection mirror being convex and centrally apertured as at 82 to form an exit pupil closely adjacent (see FIGS. 2 and 3) the eyes of an observer indicated at 36 in FIG. 3. As shown in FIG. 3 the exit pupil located at lens aperture 82 is adjacent and above the head of the viewer 36 and in the center of a sphere 86. This depending arrangement of equipment and resulting close arrangement of observer's eyes and centered sphere arrangement provides for minimized perspective distortion of image as viewed by the viewer and no shadow interference by the viewer. This recessing of the upper terminal 22 of the arc lamp 16 through the collector-reflector mirror 18 also eliminates detrimental shadow effects.

Figure 4A:
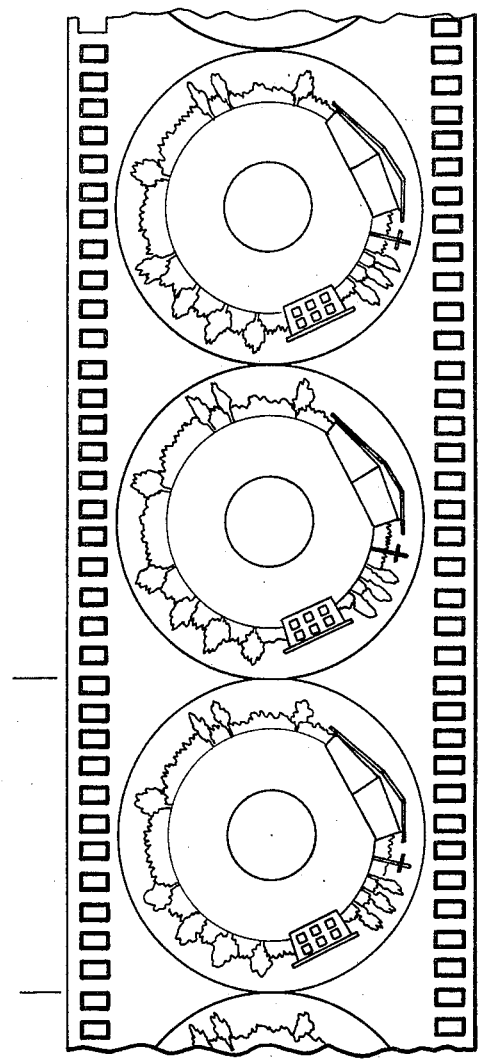
FIGS. 4a and 4b are diagrammatic formats of films depicting images of different angle width used to show the sandwiching of images to provide economy of film used and reduction of film pull down required.
Figure 4B:
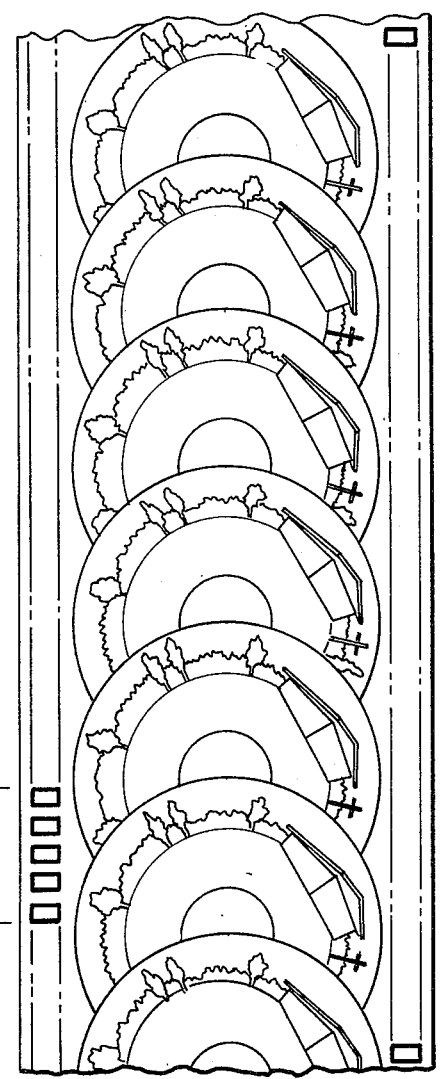

A further concept of the invention and advantage thereof in relation to the use of film is shown in FIGS. 4a and 4b. In FIG. 4a is shown the film as required to provide a 360° angle of images. However, the apparatus according to the invention is useful also for any image angle up to 360°. Thus, as shown in FIG. 4b a 240° image may be projected. In such case the recommended pulldown stroke may be reduced 50% by sandwiching the images in on the film as shown in FIG. 4b. Thus, the perforation pulldown of the film per FIG. 4a (which is the normal full frame pulldown) is 11 perforations. But with the film per FIG. 4b the pulldown in 5 perforations. This results in economy of film use and improvement of reliability by reducing the speed of film movement and further reduces the complexity and precision required of the film transfer means.

It is to be understood that various changes can be made in the arrangement of parts and choice of elements without departing from the true spirit and scope of the invention and it is intended that the appended claims be accorded an interpretation sufficiently broad as to cover such modifications.

What is claimed is:

1. In apparatus for producing panoramic scenes up to 360° wide, comprising in combination:
    a concave-mirror collector-reflector having an opening through the wall thereof at the apex thereof;
    an elongated arc lamp extending through the opening in the wall at the apex of said concave mirror reflector-collector in such manner as to position the light emitting source portion thereof at the focal point of said concave mirror reflector-collector;
    a condensing lens spatially disposed from said elongated arc lamp and said convex mirror collector-reflector in such manner that light rays from said arc lamp are reflected and directed by said mirror collector-reflector therethrough to a predetermined point of conversion;
    a convex projector mirror spatially disposed from the side of the aforesaid condensing lens that is opposite said convex mirror collector-reflector and centrally apertured in such manner that the aperture thereof forms an exit pupil therethrough that coincides with the aforesaid point of conversion;
    a concave mirror contoured to receive said light rays through the exit pupil of said convex projector mirror and spatially disposed therefrom in such manner as to reflect said light rays back to the convex mirror portion thereof, so as to be projected thereby;
    means for positioning a film to be projected in the light ray path between said condensing lens and the exit pupil of said convex projector mirror;
    a substantially spherical screen spatially disposed around said convex projector mirror in such manner that the center thereof concides with the aforesaid exit pupil and that the inside surface thereof receives rays projected by the convex mirror surface of said convex projector mirror;
    support means effectively connected to said concave miror collector-reflector, said elongated arc lamp, said condensing lens, said convex projector mirror, said concave mirror, and said film positioning means for effecting the mounting thereof within said substantially spherical screen in such manner as to position the aforesaid exit pupil of said convex projector mirror at a position that is substantially coincident with the center of said substantially spherical screen; and means disposed within said substantially spherical screen for seating a human viewer therein in such manner that the eyes thereof are in a close proximity with the aforesaid exit pupil as desired and for placing the head thereof in the shadow zone of the aforesaid concave mirror.

2. The apparatus of claim 1, further characterized by a curved light-transparent envelope included in said support means for protecting the mirror surfaces of said convex projector mirror and the aforesaid concave mirror from dust and other particles adverse thereto and the light projected and reflected thereby, respectively.

3. The apparatus of claim 1, further characterized by a film mounted for predetermined movement on said film positioning means.

* * * * *